United States Patent
Hattori

(10) Patent No.: US 11,685,309 B2
(45) Date of Patent: Jun. 27, 2023

(54) DOWNSIZED VEHICLE PROJECTION DEVICE HAVING REFLECTIVE SURFACE AND VEHICLE VIEWING DEVICE

(71) Applicant: KABUSHIKI KAISHA TOKAI-RIKA-DENKI-SEISAKUSHO, Aichi-ken (JP)

(72) Inventor: Tomomi Hattori, Aichi-ken (JP)

(73) Assignee: KABUSHIKI KAISHA TOKAI-RIKA-DENKI-SEISAKUSHO, Aichi (JP)

(*) Notice: Subject to any disclaimer, the term of this patent is extended or adjusted under 35 U.S.C. 154(b) by 12 days.

(21) Appl. No.: 17/011,609

(22) Filed: Sep. 3, 2020

(65) Prior Publication Data

US 2021/0072628 A1  Mar. 11, 2021

(30) Foreign Application Priority Data

Sep. 9, 2019 (JP) ................. 2019-163652

(51) Int. Cl.
*B60Q 1/26* (2006.01)
*B60Q 1/50* (2006.01)
*G03B 21/14* (2006.01)

(52) U.S. Cl.
CPC ............ *B60Q 1/2665* (2013.01); *B60Q 1/50* (2013.01); *B60Q 2400/50* (2013.01); *G03B 21/145* (2013.01)

(58) Field of Classification Search
CPC .... B60Q 1/2665; B60Q 1/50; B60Q 2400/50; G03B 21/145
See application file for complete search history.

(56) References Cited

U.S. PATENT DOCUMENTS

| | | | | |
|---|---|---|---|---|
| 7,828,448 B2* | 11/2010 | Kim | ....................... | H04N 9/315 |
| | | | | 362/217.05 |
| 9,739,437 B2* | 8/2017 | Otsubo | ................. | F21S 41/148 |
| 10,298,890 B2* | 5/2019 | Karikomi | ............... | G01D 11/28 |
| 2001/0043313 A1* | 11/2001 | Okura | ................... | G03B 21/001 |
| | | | | 353/97 |
| 2006/0133101 A1* | 6/2006 | Furtwangler | ........... | F21S 45/10 |
| | | | | 362/494 |
| 2006/0221310 A1* | 10/2006 | Kim | ................... | G03B 21/2066 |
| | | | | 353/99 |
| 2008/0198372 A1 | 8/2008 | Pan | | |
| 2008/0285293 A1* | 11/2008 | Sato | ..................... | B60Q 1/2665 |
| | | | | 362/487 |

(Continued)

FOREIGN PATENT DOCUMENTS

JP        07-251672 A     10/1995
JP     2008-201407 A      9/2008

(Continued)

*Primary Examiner* — Bao-Luan Q Le
(74) *Attorney, Agent, or Firm* — Thomas W. Cole; Calderon Safran & Cole P.C.

(57) ABSTRACT

A vehicle projection device including: a reflector that is provided in a vehicle and is provided with a reflective surface, with the reflective surface reflecting light; an image member that is provided with an image and through which the light reflected by the reflective surface is transmitted; and a lens through which the light that has been transmitted through the image member is transmitted, whereby the image is magnified and projected.

7 Claims, 5 Drawing Sheets

(56) References Cited

U.S. PATENT DOCUMENTS

| | | | | |
|---|---|---|---|---|
| 2009/0161379 | A1* | 6/2009 | Liesener | B60R 1/1207 362/494 |
| 2010/0061113 | A1* | 3/2010 | Sato | B60Q 1/2665 362/518 |
| 2010/0290241 | A1* | 11/2010 | Tsukamoto | F21S 41/151 362/519 |
| 2011/0273671 | A1* | 11/2011 | Chu | G03B 21/14 353/13 |
| 2015/0062948 | A1* | 3/2015 | Otsubo | F21S 41/43 362/509 |
| 2016/0142689 | A1* | 5/2016 | Karikomi | H04N 9/3185 348/745 |
| 2017/0016586 | A1* | 1/2017 | Tsuda | F21S 41/321 |
| 2017/0066386 | A1* | 3/2017 | Sawada | B60R 1/06 |
| 2017/0368985 | A1* | 12/2017 | Yokoyama | F21S 41/285 |
| 2017/0371235 | A1* | 12/2017 | Yokoyama | B60Q 1/2665 |

FOREIGN PATENT DOCUMENTS

| | | |
|---|---|---|
| JP | 2012-119284 A | 6/2012 |
| JP | 2014-127225 A | 7/2014 |
| JP | 2017-052357 A | 3/2017 |
| JP | 2017-212070 A | 11/2017 |

\* cited by examiner

DOWNSIZED VEHICLE PROJECTION DEVICE HAVING REFLECTIVE SURFACE AND VEHICLE VIEWING DEVICE

CROSS-REFERENCE TO RELATED APPLICATION

This application is based on and claims priority under 35 USC 119 from Japanese Patent Application No. 2019-163652 filed on Sep. 9, 2019, the disclosure of which is incorporated by reference herein.

BACKGROUND

Technical Field

The present disclosure relates to a vehicle projection device that projects an image and a vehicle viewing device including the vehicle projection device.

Related Art

U.S. Patent Application Publication No. 2011/0273671 discloses a projector where light from a lamp is transmitted through a screen. The light that has been transmitted through the screen is further transmitted through a pair of lenses, whereby a pattern on the screen is magnified and projected.

Here, being able to downsize the projector is preferred.

SUMMARY

In consideration of the above circumstances, it is an object of the present disclosure to obtain a vehicle projection device that can be downsized and a vehicle viewing device including the vehicle projection device.

A vehicle projection device of a first aspect of the disclosure includes: a reflector that is provided in a vehicle and is provided with a reflective surface, with the reflective surface reflecting light; an image member that is provided with an image and through which the light reflected by the reflective surface is transmitted; and a lens through which the light that has been transmitted through the image member is transmitted, whereby the image is magnified and projected.

A vehicle projection device of a second aspect of the disclosure is the vehicle projection device of the first aspect of the disclosure, wherein the light reflected by the reflective surface is formed into parallel light.

A vehicle projection device of a third aspect of the disclosure is the vehicle projection device of the first aspect or the second aspect of the disclosure, wherein the reflective surface is a surface on a vertex side of a paraboloid of revolution.

A vehicle projection device of a fourth aspect of the disclosure is the vehicle projection device of any one of the first aspect to the third aspect of the disclosure, wherein at least one of the image member and the lens is assembled to the reflector.

A vehicle projection device of a fifth aspect of the disclosure is the vehicle projection device of any one of the first aspect to the fourth aspect of the disclosure, wherein the image member side of the lens and the side opposite the image member side are convex.

A vehicle projection device of a sixth aspect of the disclosure is the vehicle projection device of any one of the first aspect to the fifth aspect of the disclosure, wherein at least one of the reflective surface that reflects the light and the image through which the light is transmitted is changeable.

A vehicle viewing device of a seventh aspect of the disclosure includes: a viewing component that assists viewing by an occupant of a vehicle; and the vehicle projection device of any one of the first aspect to the sixth aspect of the disclosure.

In the vehicle projection device of the first aspect of the disclosure, the reflector is provided in the vehicle, and the reflective surface of the reflector reflects light. The light reflected by the reflective surface is transmitted through the image member, and the light that has been transmitted through the image member is transmitted through the lens, whereby the image on the image member is magnified and projected.

Here, as described above, the light reflected by the reflective surface is transmitted through the image member. For this reason, the reflective surface can adjust the light transmitted through the image member, the distance between the reflective surface and the image member can be shortened, and the vehicle projection device can be downsized.

In the vehicle projection device of the second aspect of the disclosure, the light reflected by the reflective surface is formed into parallel light. For this reason, the sharpness of the image that is projected can be enhanced.

In the vehicle projection device of the third aspect of the disclosure, the reflective surface is a surface on the vertex side of a paraboloid of revolution. For this reason, the dimension of the reflective surface in the light reflection direction can be reduced.

In the vehicle projection device of the fourth aspect of the disclosure, at least one of the image member and the lens is assembled to the reflector. For this reason, the relative positional accuracy between the reflector and the at least one of the image member and the lens can be enhanced.

In the vehicle projection device of the fifth aspect of the disclosure, the image member side of the lens and the side opposite the image member side are convex. For this reason, the refractivity of the light transmitted through the lens can be enhanced.

In the vehicle projection device of the sixth aspect of the disclosure, at least one of the reflective surface that reflects the light and the image through which the light is transmitted is changeable. For this reason, at least one of the direction in which the image is projected and the image that is projected can be changed.

In the vehicle viewing device of the seventh aspect of the disclosure, the viewing component assists the viewing by the occupant of the vehicle.

Here, the vehicle viewing device includes the vehicle projection device of any one of the first aspect to the sixth aspect of the disclosure. For this reason, the same effects as those of the vehicle projection device of any one of the first aspect to the sixth aspect of the disclosure can be achieved.

BRIEF DESCRIPTION OF THE DRAWINGS

Exemplary embodiments of the present disclosure will be described in detail based on the following figures, wherein.

DETAILED DESCRIPTION

First Embodiment

Figure 1:
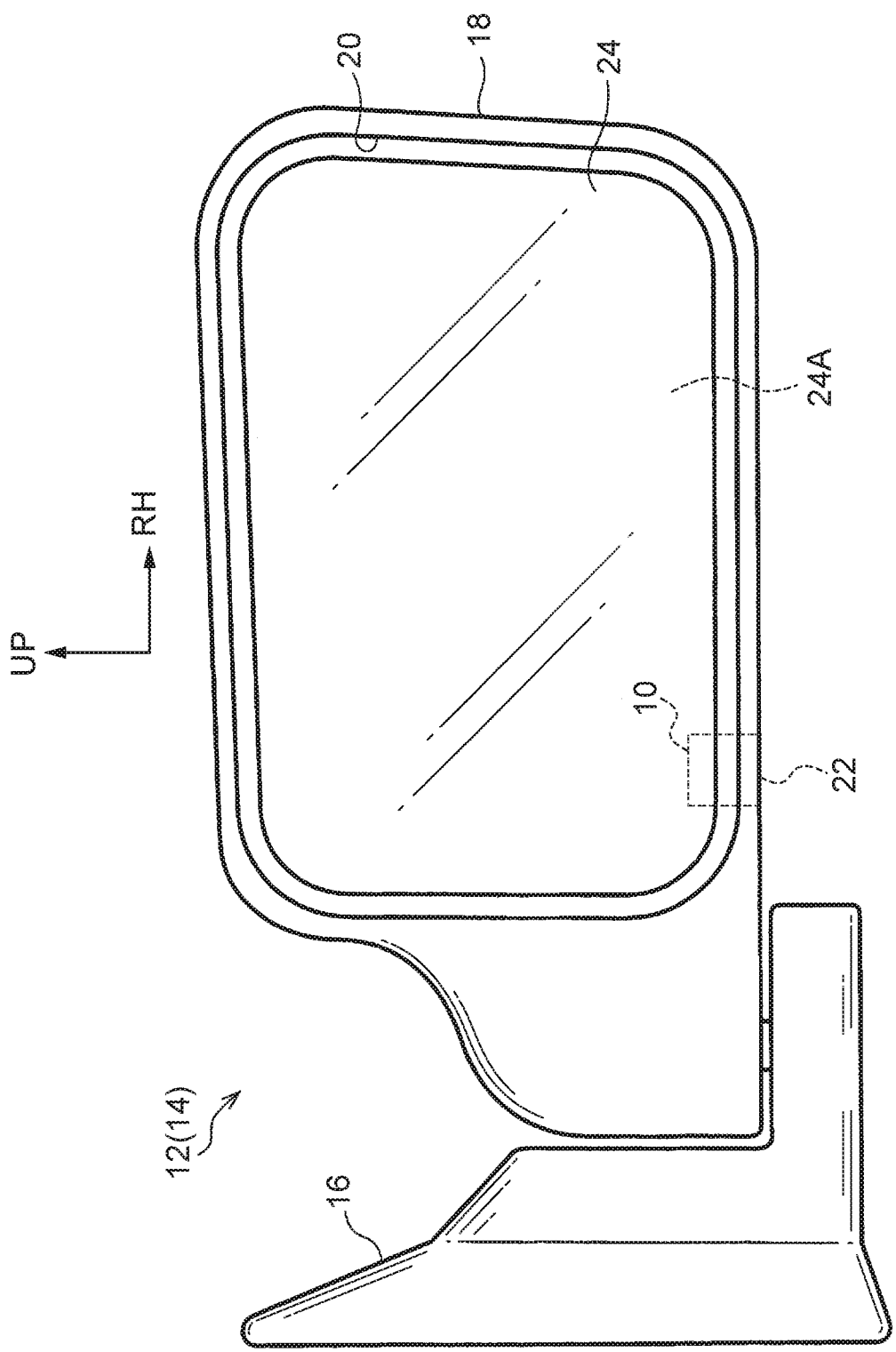
FIG. 1 is a front view showing a vehicle door mirror device in a first embodiment of the disclosure seen from the vehicle rear direction.

In FIG. 1 a vehicle door mirror device 12 serving as a vehicle viewing device (an installation body) in which is installed a vehicle projection device 10 pertaining to a first embodiment of the disclosure is shown in a front view seen from the vehicle rear direction. In the drawings, arrow FR indicates the vehicle forward direction, arrow RH indicates the vehicle rightward direction (outward in the vehicle width direction), and arrow UP indicates the upward direction.

The vehicle door mirror device 12 in the present embodiment is provided on the outside of the up and down direction middle portion and the vehicle front-side end of a side door (particularly a front side door; a vehicle body side) serving as a door of a vehicle 14.

As shown in FIG. 1, the vehicle door mirror device 12 has a stay 16 serving as an anchoring member. The vehicle door mirror device 12 is anchored to the side door as a result of the vehicle left-side end (the vehicle width direction inner end) of the stay 16 being anchored to the side door.

On the vehicle right-side part of the stay 16, a visor 18 substantially in the shape of a cuboid container and serving as an installation member is supported. The visor 18 is disposed on the vehicle right side of the stay 16. An opening 20 substantially rectangular in shape is formed through the vehicle rear-side wall of the visor 18. The opening 20 opens the inside of the visor 18 in the vehicle rearward direction. A through hole 22 substantially rectangular in shape is formed through the lower wall of the visor 18. The through hole 22 opens the inside of the visor 18 downward.

In the neighborhood of the opening 20 inside the visor 18, a mirror 24 substantially in the shape of a rectangular plate and serving as a viewing component is installed. The mirror 24 substantially closes off the opening 20. A mirror surface 24A of the mirror 24 is pointed in the vehicle rearward direction, whereby the mirror 24 enables an occupant (particularly a driver) of the vehicle to see in the vehicle rearward direction and assists viewing by the occupant.

Figure 2A:
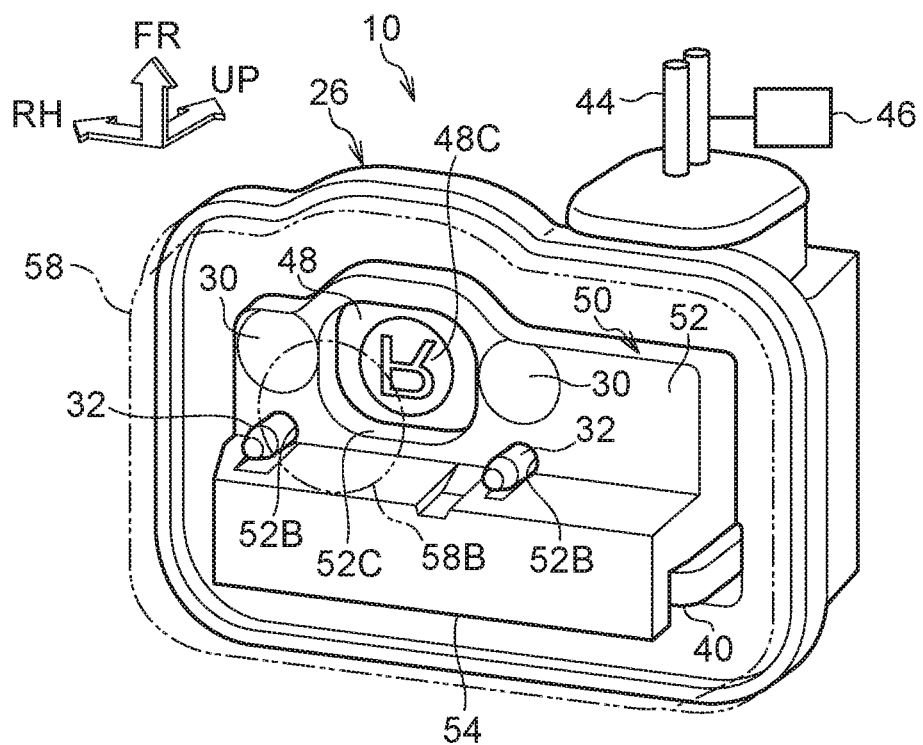
FIG. 2A is a perspective view showing a vehicle projection device pertaining to the first embodiment of the disclosure seen from the vehicle left direction and below.

Inside the visor 18, on the upper side of the through hole 22, a vehicle projection device 10 (see FIG. 2A and FIG. 2B, FIG. 3) is installed.

The vehicle projection device 10 is provided with a reflector 26 (see FIG. 4A) that is substantially made of resin, is substantially in the shape of a cuboid container, and serves as a reflector (outer member). The inside of the reflector 26 opens downward. The reflector 26 is anchored inside the visor 18, whereby the vehicle projection device 10 is installed inside the visor 18. A reflective film 26A made of aluminum and serving as a reflective material is vapor-deposited and formed on the entire inner surface of the reflector 26.

Abutment plates 28 substantially in the shape of rectangular plates are integrally formed on the vehicle right-side end portion and the vehicle right and left direction center portion of the vehicle front-side part of the inside of the reflector 26. The abutment plates 28 are disposed perpendicular to the vehicle right and left direction. The abutment plate 28 on the vehicle right side is integrated with the vehicle right-side wall, the vehicle front-side wall, and the upper wall of the reflector 26. The abutment plate 28 on the vehicle left side is integrated with the vehicle front-side wall and the upper wall of the reflector 26. The lower surfaces of the abutment plates 28 are disposed perpendicular to the up and down direction and are flush with the lower surface of the peripheral wall of the reflector 26.

Weld pins 30 cylindrical in shape and serving as anchoring portions are integrally formed on the vehicle front-side parts of the lower surfaces of each of the abutment plates 28. The weld pins 30 project downward. Mating pins 32 cylindrical in shape and serving as positioning portions are integrally formed on the vehicle rear-side parts of the lower surfaces of each of the abutment plates 28. The mating pins 32 project downward.

Inside the reflector 26, upper interfitting frames 34 substantially in the shape of U-shaped frames and serving as first interfitting portions are formed on the vehicle rear side of each of the abutment plates 28. The upper interfitting frame 34 on the vehicle right side is integrated with the vehicle right-side wall, the vehicle rear-side wall, and the upper wall of the reflector 26 and the abutment plate 28. The upper interfitting frame 34 on the vehicle left side is integrated with the vehicle rear-side wall and the upper wall of the reflector 26 and the abutment plate 28. The insides (inside spaces) of the upper interfitting frames 34 are rectangular in cross section, run through the upper interfitting frames 34 in the vehicle right and left direction, and open downward.

On the upper surface (bottom surface) of the inside of the reflector 26, a reflective surface 36 in the shape of a curved recess is formed between the pair of abutment plates 28. The reflective surface 36 is formed by the reflective film 26A and is capable of reflecting light. The reflective surface 36 is a part in the neighborhood of the vertex of a paraboloid of revolution (e.g., a part nearer the vertex than the focal point of the paraboloid of revolution). The axis of the reflective surface 36 (paraboloid of revolution) is disposed on the vehicle rear side of the reflective surface 36 and is parallel to the up and down direction.

A connection hole 38 rectangular in shape is formed through the vehicle left-side part of the vehicle front-side wall of the reflector 26. The connection hole 38 opens the inside of the reflector 26 in the vehicle forward direction.

A circuit board 40 (see FIG. 4A) substantially in the shape of a rectangular plate and serving as a supplier is housed in the vehicle rear-side part of the inside of the reflector 26. The circuit board 40 is incapable of transmitting light and is disposed perpendicular to the vehicle front and rear direction. The circuit board 40 is fitted inside the upper interfitting frames 34 of the reflector 26 in the vehicle front and rear direction, whereby movement of the circuit board 40 in the vehicle front and rear direction is locked. The circuit board 40 is in abutting contact with the upper wall of the reflector 26, whereby movement of the circuit board 40 upward is locked. The circuit board 40 is also fitted inside the reflector 26 in the vehicle right and left direction, whereby movement of the circuit board 40 in the vehicle right and left direction is locked. The circuit board 40 projects downward from the reflector 26.

A connector 42 is anchored to the upper and vehicle left-side part of the vehicle front-side surface of the circuit board 40. The connector 42 is electrically connected to the circuit board 40 and faces the connection hole 38 in the reflector 26. A cord 44 is electrically connected to the connector 42. The cord 44 is passed through the connection hole 38 and seals the connection hole 38. The cord 44 is routed to the vehicle body side and is electrically connected to a control device 46 of the vehicle.

An LED 40A serving as a light source is anchored to the upper and vehicle right-side part of the vehicle front-side surface of the circuit board 40. The LED 40A is disposed in the position of the focal point of the reflective surface 36 (paraboloid of revolution) of the reflector 26. Power is supplied to the LED 40A via the cord 44, the connector 42, and the circuit board 40 by control of the control device 46, and the LED 40A emits light in the vehicle forward direction.

A film 48 substantially in the shape of a rectangular sheet (see FIG. 4B) is disposed on the lower side of the reflector 26. The film 48 is in abutting contact (surface contact) from below with the lower surface of the peripheral wall of the reflector 26 and the lower surfaces of the abutment plates 28 and is disposed perpendicular to the up and down direction. First pass-through holes 48A serving as first anchored portions are formed through the vehicle left-side end portion and the vehicle right-side end portion of the vehicle front-side part of the film 48. The weld pins 30 of the reflector 26 are passed through and substantially mated with the first pass-through holes 48A. First mating holes 48B serving as first positioned portions are formed through the vehicle left-side end portion and the vehicle right-side end portion of the vehicle rear-side part of the film 48. The first mating hole 48B on the vehicle left side is circular. The first mating hole 48B on the vehicle right side is substantially circular and extends in the vehicle right and left direction. The mating pins 32 of the reflector 26 are passed through the first mating holes 48B. The mating pin 32 on the vehicle left side is mated along its entire circumference with the first mating hole 48B on the vehicle left side, and the mating pin 32 on the vehicle right side is mated in the vehicle front and rear direction with the first mating hole 48B on the vehicle right side, whereby the film 48 is positioned in the vehicle front and rear direction and the vehicle right and left direction on the reflector 26.

A pattern 48C (e.g., a mark or a logo) serving as an image is provided in the central portion of the film 48. The pattern 48C is disposed under the reflective surface 36 of the reflector 26, and the film 48 (including the pattern 48C) is capable of transmitting light.

A shade 50 (see FIG. 4C) made of black resin and serving as a shield is assembled to the reflector 26.

A cover plate 52 in the shape of a rectangular plate and serving as a cover portion is provided on the vehicle front-side part of the shade 50. The cover plate 52 is disposed perpendicular to the up and down direction and is in abutting contact (surface contact) with the film 48 from below. Second pass-through holes 52A serving as second anchored portions are formed through the vehicle right-side end portion and the vehicle right and left direction center portion of the vehicle front-side part of the cover plate 52. The weld pins 30 of the reflector 26 are passed through and substantially mated with the second pass-through holes 52A on the lower side of the first pass-through holes 48A in the film 48. Second mating holes 52B serving as second positioned portions are formed through the vehicle left-side end portion and the vehicle right and left direction center portion of the vehicle rear-side part of the cover plate 52. The second mating hole 52B on the vehicle left side is circular. The second mating hole 52B on the vehicle right side is substantially circular and extends in the vehicle right and left direction. The mating pins 32 of the reflector 26 are passed through the second mating holes 52B on the lower side of the first mating holes 48B in the film 48. The mating pin 32 on the vehicle left side is mated along its entire circumference with the second mating hole 52B on the vehicle left side, and the mating pin 32 on the vehicle right side is mated in the vehicle front and rear direction with the second mating hole 52B on the vehicle right side, whereby the shade 50 is positioned in the vehicle front and rear direction and the vehicle right and left direction on the reflector 26.

The lower portions (parts on the distal end side) of the weld pins 30 of the reflector 26 are welded to the cover plate 52 by heat staking (see FIG. 4D), whereby the shade 50 is anchored to the reflector 26 and the cover plate 52 covers the vehicle front-side part of the inside of the reflector 26 from below. The cover plate 52 supports the film 48 between itself, the lower surface of the peripheral wall of the reflector 26, and the lower surfaces of the abutment plates 28, whereby movement of the film 48 in the up and down direction is locked. A projection hole 52C rectangular in shape is formed through the vehicle right-side part of the cover plate 52. The projection hole 52C exposes the pattern 48C on the film 48 to the lower side.

A locking plate 54 in the shape of a cross-sectionally L-shaped plate and serving as a locking portion is provided on the vehicle rear-side part of the shade 50. The locking plate 54 covers the vehicle rear-side part of the inside of the reflector 26 from below. The vehicle front-side part of the locking plate 54 projects downward from the vehicle rear-side end of the cover plate 52. The vehicle rear-side part of the locking plate 54 extends in the vehicle rearward direction from the lower end of the vehicle front-side part of the cover plate 52. A lower interfitting frame 54A substantially in the shape of a U-shaped frame and serving as a second interfitting portion is formed in the vehicle right and left direction center portion of the inside of the locking plate 54. The lower interfitting frame 54A is integrated with the vehicle front-side part and the vehicle rear-side part of the locking plate 54. The inside (inside space) of the lower interfitting frame 54A is rectangular in cross section, runs through the lower interfitting frame 54A in the vehicle right and left direction, and opens upward. The circuit board 40 is fitted inside the lower interfitting frame 54A in the vehicle front and rear direction, whereby movement of the circuit board 40 in the vehicle front and rear direction is locked. The circuit board 40 is in abutting contact with the vehicle rear-side part of the locking plate 54, whereby movement of the circuit board 40 downward is locked.

An extension plate 56 in the shape of a long rectangular plate is provided on the upper part of the shade 50. The extension plate 56 extends upward from the vehicle right-side part of the vehicle rear-side end portion of the cover plate 52 and is disposed on the vehicle front side of the circuit board 40. A passage hole 56A substantially circular in shape is formed through the upper portion of the extension plate 56. The direction in which the passage hole 56A runs through the extension plate 56 is inclined in a direction heading upward in the vehicle forward direction. The passage hole 56A is disposed on the upper side of the LED 40A of the circuit board 40. The light emitted by the LED 40A passes through the passage hole 56A and is reflected by the reflective surface 36 of the reflector 26.

A lens 58 substantially in the shape of a cuboid container is assembled to the reflector 26. The inside of the lens 58 opens upward. The lens 58 is made of a transparent resin and is capable of transmitting light. A weld frame 58A rectangular in cross section and serving as an assembly portion is integrally formed along the entire circumference of the upper surface of the peripheral wall of the lens 58. The weld frame 58A projects upward. The entire circumference of the weld frame 58A is welded by vibration welding to the entire circumference of the lower surface of the peripheral wall of the reflector 26, whereby the lens 58 is assembled to the reflector 26 and the space between the reflector 26 and the lens 58 is sealed.

A lens portion 58B substantially in the shape of a disc is formed in a vehicle front-side and vehicle right-side part of the lower wall (bottom wall) of the lens 58. The lens portion 58B is disposed under the projection hole 52C in the shade 50 and faces the pattern 48C on the film 48 on the underside thereof. The upper surface of the lens portion 58B is an upwardly convex spherical surface, and the lower surface of the lens portion 58B is a downwardly convex spherical surface.

The lens 58 is inserted into the through hole 22 in the visor 18, and the lower wall of the lens 58 (including the lens portion 58B) is exposed to the lower side of the visor 18.

Next, the action of the present embodiment will be described.

Figures 4A, 4B, 4C:
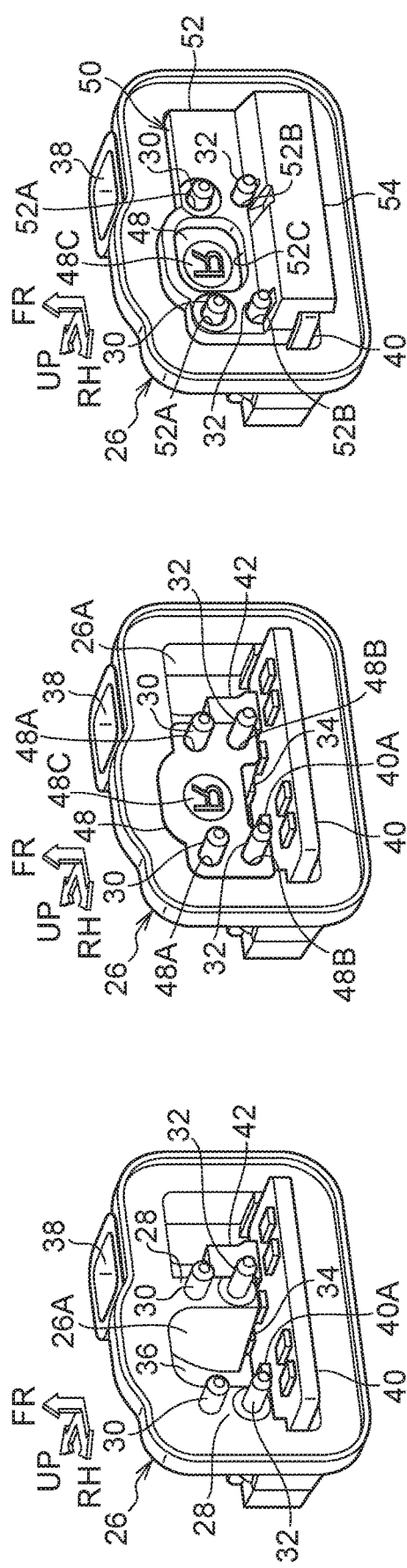
FIG. 4A to FIG. 4E are perspective views showing stages in assembling the vehicle projection device pertaining to the first embodiment of the disclosure seen from the vehicle right direction and below, with FIG. 4A showing a first stage of assembly, FIG. 4B showing a second stage of assembly, FIG. 4C showing a third stage of assembly, FIG. 4D showing a fourth stage of assembly, and FIG. 4E showing a fifth stage of assembly (a state in which assembly is complete)
Figure 4D:
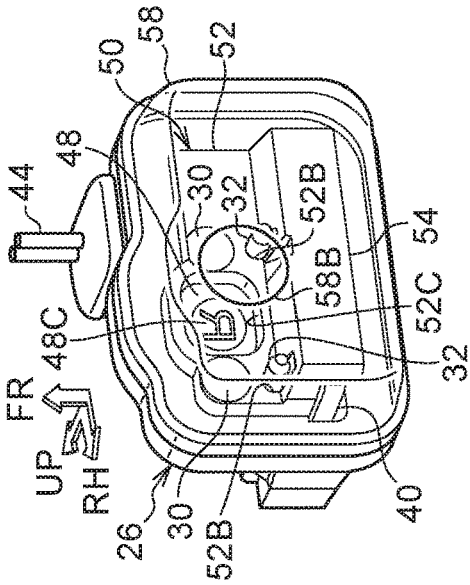

When the vehicle projection device 10 having the above configuration is to be assembled, first, the circuit board 40 is put in the vehicle rear-side part of the inside of the reflector 26 (see FIG. 4A). Then, the weld pins 30 of the reflector 26 are passed through the first pass-through holes 48A in the film 48, the mating pins 32 of the reflector 26 are passed through the first mating holes 48B in the film 48, and the film 48 is brought into abutting contact with the lower surface of the peripheral wall of the reflector 26 and the lower surfaces of the abutment plates 28 (see FIG. 4B).

Then, the weld pins 30 of the reflector 26 are passed through the second pass-through holes 52A in the shade 50, the mating pins 32 of the reflector 26 are passed through the second mating holes 52B in the shade 50, and the cover plate 52 of the shade 50 is brought into abutting contact with the film 48 (see FIG. 4C). Then, the lower portions of the weld pins 30 of the reflector 26 are welded to the cover plate 52 by heat staking, whereby the shade 50 is anchored to the reflector 26 and the film 48 is sandwiched and held between the lower surface of the peripheral wall of the reflector 26, the lower surfaces of the abutment plates 28, and the cover plate 52 of the shield 50 (see FIG. 4D).

Figure 4E:
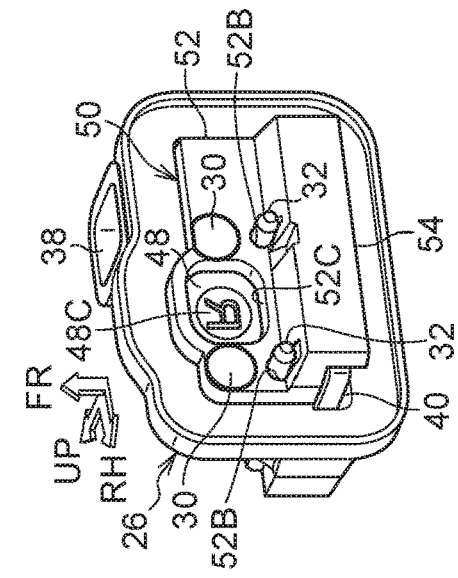

Thereafter, the entire circumference of the weld frame 58A of the lens 58 is welded by vibration welding to the entire circumference of the lower surface of the peripheral wall of the reflector 26 (see FIG. 4E). Moreover, the cord 44 is passed through the connection hole 38 in the reflector 26 and is connected to the connector 42 of the circuit board 40 (see FIG. 4E).

Figure 2B:
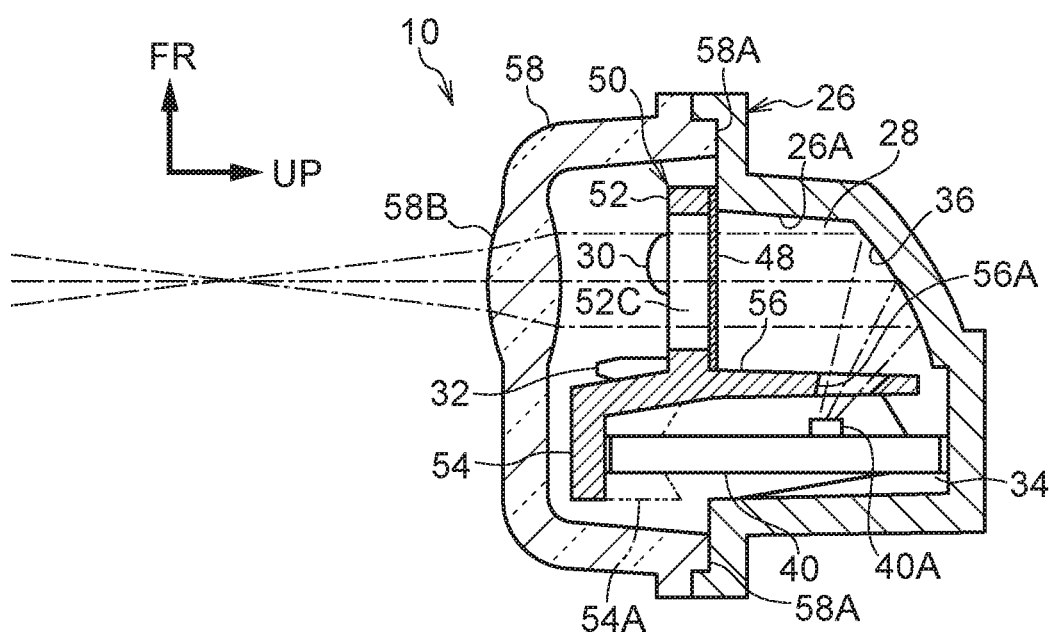
FIG. 2B is a sectional view showing the vehicle projection device pertaining to the first embodiment of the disclosure seen from the vehicle left direction.
Figure 3:
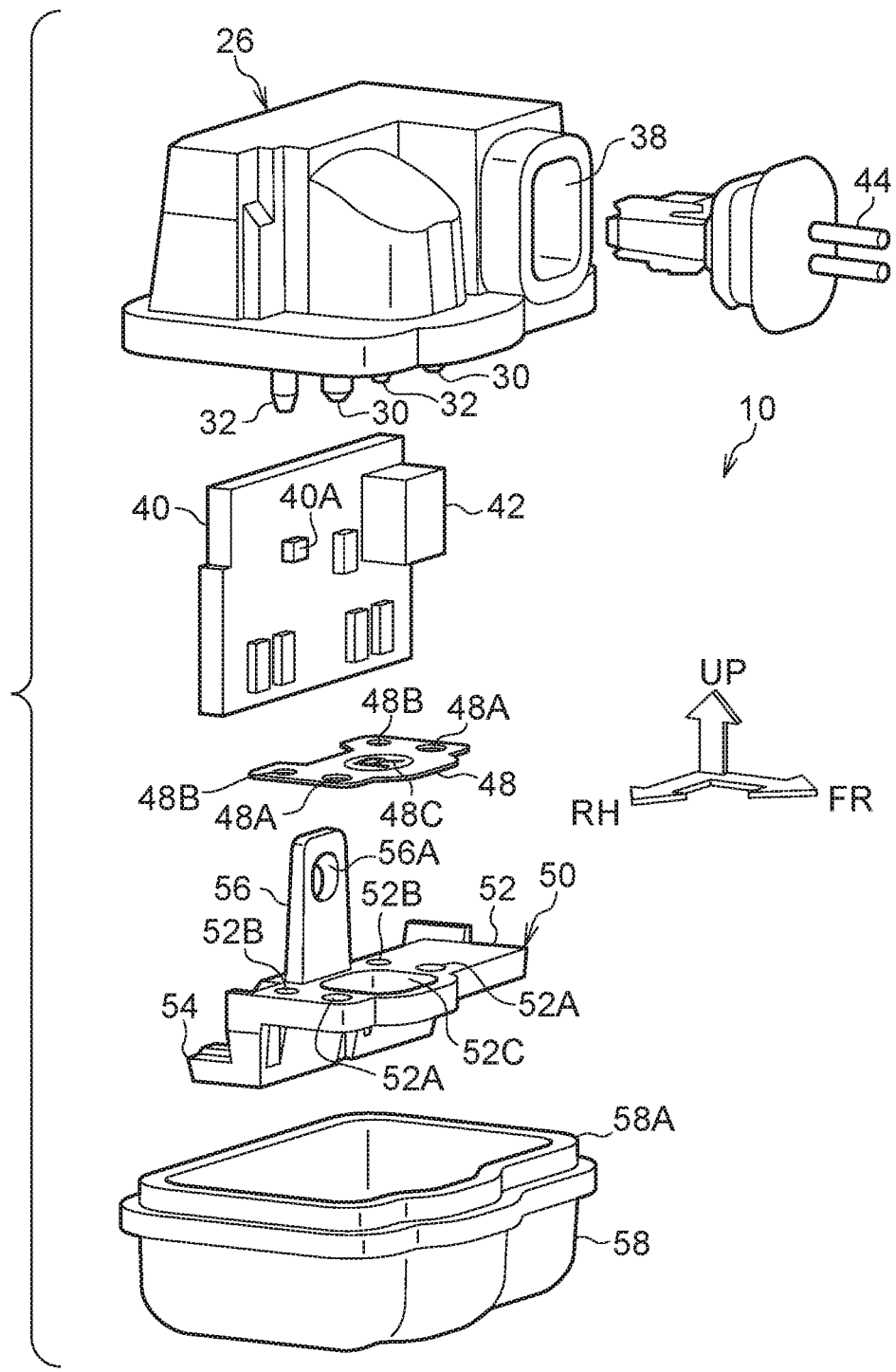
FIG. 3 is an exploded perspective view showing the vehicle projection device pertaining to the first embodiment of the disclosure seen obliquely from the vehicle front right direction.

In this connection, in the vehicle door mirror device 12, power is supplied to the LED 40A via the cord 44, the connector 42, and the circuit board 40 by the control of the control device 46 in the vehicle projection device 10, and the LED 40A emits light in the vehicle forward direction (see FIG. 2B). For this reason, the light emitted by the LED 40A passes through the pass-through hole 56A in the extension plate 56 of the shade 50 and is reflected downward by the reflective surface 36 of the reflector 26, whereby the light that has been reflected by the reflective surface 36 is transmitted (passes) through the film 48, the projection hole 52C in the shade 50, and the lens portion 58B of the lens 58 (the through hole 22 in the visor 18), and the pattern 48C on the film 48 is projected (cast) onto the ground (e.g., a road surface) outside the vehicle 14. Furthermore, the light that is transmitted through the lens portion 58B of the lens 58 is refracted, and the light that has been transmitted through the lens portion 58B converges and thereafter diverges, whereby the pattern 48C that becomes projected onto the ground outside the vehicle 14 is magnified.

Here, as described above, the light reflected by the reflective surface 36 of the reflector 26 is transmitted through the film 48. For this reason, the reflective surface 36 can adjust the light transmitted through the film 48, the distance between the reflective surface 36 and the film 48 can be shortened, and the vehicle projection device 10 can be downsized in the up and down direction.

Moreover, the LED 40A is disposed in the position of the focal point of the reflective surface 36 (paraboloid of revolution) of the reflector 26, and the light reflected by the reflective surface 36 is formed into parallel light and transmitted through the film 48. For this reason, the sharpness of the pattern 48C projected onto the ground outside the vehicle 14 can be enhanced. Moreover, the need to provide a lens for forming into parallel light the light transmitted through the film 48 can be eliminated, so that the vehicle projection device 10 can be downsized in the up and down direction and costs (including the material cost, processing cost, and assembly cost of the lens) can be reduced.

Furthermore, the reflective surface 36 of the reflector 26 is a surface in the neighborhood of the vertex of the paraboloid of revolution. For this reason, the dimension of the reflective surface 36 in the up and down direction (light reflection direction) can be reduced, so that the vehicle projection device 10 can be downsized in the up and down direction.

Moreover, the light emitted by the LED 40A is transmitted through the passage hole 56A in the extension plate 56 of the shade 50 and is reflected by the reflective surface 36 of the reflector 26. For this reason, light not transmitted through the passage hole 56A is blocked by the extension plate 56, whereby the light can be inhibited from being reflected by parts other than the reflective surface 36 of the reflector 26, and the image quality of the pattern 48C projected onto the ground outside the vehicle 14 can be improved.

Furthermore, the upper surface (the film 48 side) and the lower surface (the side opposite the film 48 side) of the lens portion 58B of the lens 58 are convex spherical surfaces. For this reason, the refractivity of the light transmitted through the lens portion 58B can be enhanced, and the need to provide more than one lens on the lower side of the film 48 can be eliminated, so that the vehicle projection device 10 can be downsized in the up and down direction and costs (including the material cost, processing cost, and assembly cost of the lens) can be reduced.

Moreover, as described above, in the vehicle projection device 10, there are few lenses through which the light is transmitted (just the one lens 58). For this reason, chromatic aberration that occurs as a result of light being transmitted through lenses can be reduced, and the image quality of the pattern 48C projected onto the ground outside the vehicle 14 can be improved.

Furthermore, the circuit board 40, the film 48, the shade 50, and the lens 58 are assembled to the reflector 26. For this reason, the relative positional accuracy between the reflector 26 (the reflective surface 36), the circuit board 40 (the LED 40A), the film 48 (the pattern 48C), the shade 50 (the passage hole 56A), and the lens 58 (the lens portion 58B) can be enhanced.

In the present embodiment, the film 48 is positioned in the vehicle front and rear direction and the vehicle right and left direction on the reflector 26 by the mating pins 32 of the reflector 26 and the first mating holes 48B in the film 48, and the shade 50 is positioned in the vehicle front and rear direction and the vehicle right and left direction on the reflector 26 by the mating pins 32 of the reflector 26 and the second mating holes 52B in the shade 50. However, the film 48 may also be positioned in the vehicle front and rear direction and the vehicle right and left direction on the reflector 26 by the weld pins 30 of the reflector 26 and the first pass-through holes 48A in the film 48, and the shade 50 may also be positioned in the vehicle front and rear direction and the vehicle right and left direction on the reflector 26 by the weld pins 30 of the reflector 26 and the second pass-through holes 52A in the shade 50. In this case, a configuration not provided with the mating pins 32 of the reflector 26, the first mating holes 48B in the film 48, and the second mating holes 52B in the shade 50 can be made possible.

Furthermore, in the present embodiment, the circuit board 40, the film 48, the shade 50, and the lens 58 are assembled to the reflector 26. However, at least one of the circuit board 40, the film 48, the shade 50, and the lens 58 can also be assembled to the reflector 26.

Second Embodiment

Figure 5A:
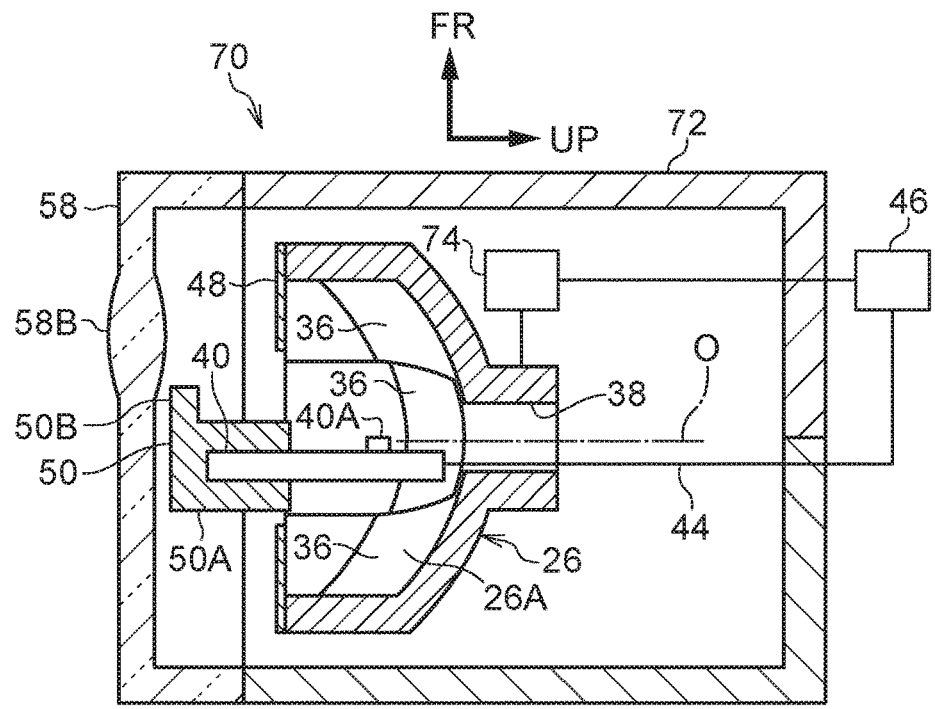
FIG. 5A and FIG. 5B are views showing a vehicle projection device pertaining to a second embodiment of the disclosure, with FIG. 5A being a sectional view seen from the vehicle left direction and FIG. 5B being a perspective view seen from the vehicle left direction and below.
Figure 5B:
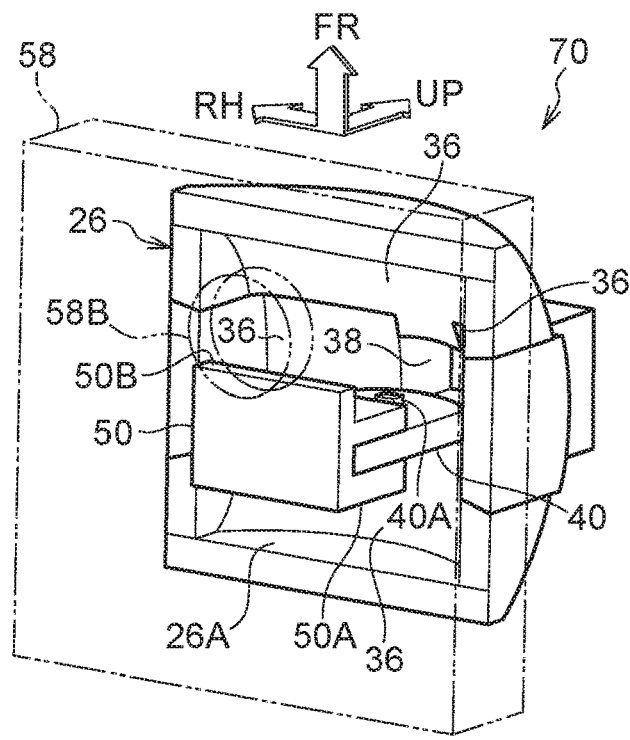

In FIG. 5A a vehicle projection device 70 pertaining to a second embodiment of the disclosure is shown in a sectional view seen from the vehicle left direction. In FIG. 5B the vehicle projection device 70 is shown in a perspective view seen from the vehicle left direction and below.

The vehicle projection device 70 pertaining to the present embodiment has substantially the same configuration as the vehicle projection device 10 pertaining to the first embodiment above, but differs in the following respects.

As shown in FIG. 5A, the vehicle projection device 70 of the present embodiment is provided with a housing 72 made of resin and substantially in the shape of a cuboid box. The inside of the housing 72 opens downward. The housing 72 is anchored inside the visor 18, whereby the vehicle projection device 70 is installed inside the visor 18.

As shown in FIG. 5A and FIG. 5B, a reflector 26 substantially in the shape of a cuboid container is supported inside the housing 72. The inside of the reflector 26 opens downward and is rotatable about a central axis O (see FIG. 5A) parallel to the up and down direction. A drive device 74 (an actuator such as a motor) is mechanically connected to the reflector 26 and is anchored inside the housing 72. The drive device 74 is electrically connected to a control device 46 via an outer peripheral wall of the housing 72 (the part of the outer peripheral wall of the housing 72 mediating the connection between the drive device 74 and the control device 46 is sealed). The reflector 26 is rotated as a result of the drive device 74 being driven by control of the control device 46.

Plural (in the present embodiment, four) reflective surfaces 36 are formed on the upper surface (bottom surface) of the inside of the reflector 26. The plural reflective surfaces 36 are arranged in the circumferential direction of the reflector 26 (a direction about the central axis O), and their axes (axes of paraboloids of revolution) coincide with the central axis O of the reflector 26.

A connection hole 38 is formed through the center of the upper wall (bottom wall) of the reflector 26. The connection hole 38 opens the inside of the reflector 26 upward.

A film 48 in the shape of a rectangular loop (not shown in FIG. 5B) is anchored to the lower surface of the peripheral wall of the reflector 26. The film 48 is integrally rotatable with the reflector 26. The film 48 is provided with plural (in the present embodiment, four) patterns 48C (not shown in FIG. 5A and FIG. 5B). The plural patterns 48C are arranged in the circumferential direction of the film 48 and are each disposed under the reflective surfaces 36 of the reflector 26. The plural patterns 48C are mutually different or mutually identical.

A lens 58 substantially in the shape of a cuboid box is assembled to the lower side of the housing 72. The inside of the lens 58 opens upward. The entire circumference of the upper surface of the peripheral wall of the lens 58 is welded by vibration welding to the entire circumference of the lower surface of the peripheral wall of the housing 72, whereby the lens 58 is assembled to the housing 72 and the space between the housing 72 and the lens 58 is sealed. A lens portion 58B is formed in a vehicle front-side and vehicle right and left direction center part of the lower wall (bottom wall) of the lens 58. The lens portion 58B faces the pattern 48C on the vehicle front side of the film 48 on the underside thereof.

A shade 50 is assembled to the substantially central part of the inner side of the lower wall of the lens 58. An interfitting frame 50A substantially in the shape of a U-shaped column and serving as an interfitting portion is formed in a part of the shade 50 excluding the vehicle front-side end portion. The interfitting frame 50A extends in the vehicle right and left direction. The inside (inside space) of the interfitting frame 50A is rectangular in cross section and opens upward. A projecting plate 50B in the shape of a long plate is formed on the vehicle front-side end portion of the shade 50. The projecting plate 50B projects in the vehicle forward direction from the lower end portion of the interfitting frame 50A and extends in the vehicle right and left direction.

The lower portion of a circuit board 40 is fitted and anchored inside the interfitting frame 50A, whereby movement of the circuit board 40 in the vehicle front and rear direction, the vehicle right and left direction, and the up and down direction is locked. The circuit board 40 extends upward from the interfitting frame 50A, is passed through the inside of the film 48, and is inserted into the reflector 26. A cord 44 is electrically connected to the circuit board 40 and is passed through the connection hole 38 in the reflector 26. The cord 44 runs through the outer peripheral wall of the housing 72 in a sealed state and is electrically connected to the control device 46.

An LED 40A is anchored to the upper and vehicle right and left direction center part of the vehicle front-side surface of the circuit board 40. The LED 40A is disposed in the position of the focal point of the reflective surfaces 36 (paraboloids of revolution) of the reflector 26.

In this connection, in the vehicle door mirror device 12, power is supplied to the LED 40A via the cord 44, the connector 42, and the circuit board 40 by the control of the control device 46 in the vehicle projection device 70, and the LED 40A emits light in the vehicle forward direction. For this reason, the light emitted by the LED 40A is reflected downward by the reflective surface 36 on the vehicle front side of the reflector 26, whereby the light that has been reflected by the reflective surface 36 on the vehicle front side is transmitted (passes) through the vehicle front-side part of the film 48 and the lens portion 58B of the lens 58 (the through hole 22 in the visor 18), and the pattern 48C on the vehicle front side of the film 48 is projected (cast) onto the ground (e.g., a road surface) outside the vehicle 14. Furthermore, the light that is transmitted through the lens portion 58B of the lens 58 is refracted, and the light that has been transmitted through the lens portion 58B converges and thereafter diverges, whereby the pattern 48C that becomes projected onto the ground outside the vehicle 14 is magnified.

Here, in the present embodiment also, excluding the action and effects resulting from the passage hole 56A in the shade 50 and the action and effects resulting from the circuit board 40, the shade 50, and the lens 58 being assembled to the reflector 26, the same action and effects as those of the first embodiment can be achieved.

Furthermore, when the drive device 74 is driven by the control of the control device 46 so that the reflector 26 and the film 48 are rotated, the reflective surface 36 on the vehicle front side of the reflector 26 and the pattern 48C on the vehicle front side of the film 48 are changed, and the reflective surface 36 on which the light is reflected and the pattern 48C through which the light is transmitted are changed. For this reason, in a case where the plural patterns 48C are mutually different, the pattern 48C projected onto the ground outside the vehicle 14 can be changed, and even in a case where the plural patterns 48C are mutually identical, the pattern 48C projected onto the ground outside the vehicle 14 can be made to flash on and off.

Moreover, the plural patterns 48C are projected onto the ground outside the vehicle 14 by the single LED 40A. For this reason, in contrast to a case where a plurality of the LEDs 40A are provided, the number of the LEDs 40A can be reduced, the configuration of the control circuit that controls the LED 40A can be simplified, and costs can be reduced.

In the present embodiment, the shade 50 is not provided with the passage hole 56A. However, the shade 50 may also be provided with the passage hole 56A.

Furthermore, in the present embodiment, the axes of the plural reflective surfaces 36 (paraboloids of revolution) are mutually coincident. However, the axes of the plural reflective surfaces 36 (paraboloids of revolution) may also be mutually different. Because of this, when the reflector 26 and the film 48 are rotated, the direction of the light (parallel light) reflected by the reflective surface 36 can be changed, and the position of the pattern 48C projected onto the ground outside the vehicle 14 can be changed. Moreover, in a case where the axes of the plural reflective surfaces 36 (paraboloids of revolution) are gradually changed along the circumferential direction of the reflector 26, when the reflector 26 and the film 48 are rotated, the direction of the light (parallel light) reflected by the reflective surface 36 can be gradually changed, and the position of the pattern 48C projected onto the ground outside the vehicle 14 can be gradually changed (e.g., the pattern 48C can be flowed).

Moreover, in the present embodiment, the reflector 26 and the film 48 are rotated as a result of the drive device 74 being driven. However, just the film 48 may also be rotated as a result of the drive device 74 being driven. In this case, the reflector 26 is provided with just the reflective surface 36 on the vehicle front side.

Furthermore, in the first embodiment and the second embodiment above, the reflector 26 or the housing 72 is anchored inside the visor 18, and the vehicle projection device 10, 70 is installed inside the visor 18. However, the lens 58 may be anchored to the visor 18, with the vehicle projection device 10, 70 being installed inside the visor 18.

Moreover, in the first embodiment and the second embodiment above, the vehicle projection device 10, 70 is installed in the vehicle door mirror device 12. However, the vehicle projection device 10, 70 may also be installed in a vehicle mirror device and a vehicle camera device (a device where a camera that assists the viewing by the occupant by capturing images is provided as a viewing component) outside the vehicle and inside the vehicle other than the vehicle door mirror device 12. Moreover, the vehicle projection device 10, 70 may also be installed in a door of the vehicle 14, so that when the door is opened for example, the pattern 48C is projected onto the ground outside the vehicle 14. Furthermore, the vehicle projection device 10, 70 may also be installed in the roof of the cabin of the vehicle 14, so that the pattern 48C is projected onto the floor of the cabin for example.

What is claimed is:

1. A vehicle projection device comprising:
   a reflector that is provided in a vehicle and is provided with a reflective surface, with the reflective surface being a paraboloid of revolution and reflecting parallel light;
   an image member that is provided with an image and through which the light reflected by the reflective surface is transmitted;
   a lens through which the light that has been transmitted through the image member is transmitted, whereby the image is magnified and projected,
   a light source,
   a shield disposed between the light source and the reflective surface including a passage hole that is provided on a line between the light source and opposing edges of the reflector,
   the reflective surface ending before a vertex of the paraboloid, and the passage hole transmitting only light emitted from the light source to the reflective surface.

2. The vehicle projection device according to claim 1, wherein the reflective surface is a surface on a vertex side of a paraboloid of revolution.

3. The vehicle projection device according to claim 1, wherein at least one of the image member and the lens is assembled to the reflector.

4. The vehicle projection device according to claim 1, wherein the image member side of the lens and the side opposite the image member side are convex.

5. The vehicle projection device according to claim 1, wherein at least one of the reflective surface that reflects the light and the image through which the light is transmitted is changeable.

6. A vehicle viewing device comprising: a viewing component that assists viewing by an occupant of a vehicle; and the vehicle projection device according to claim 1.

7. The vehicle projection device according to claim 1, further comprising circuit board, wherein the light source is disposed on the circuit board and wherein the circuit board and the image member are substantially planar and are oriented orthogonally with respect to each other.

\* \* \* \* \*